United States Patent
Sandhage et al.

(10) Patent No.: US 6,598,656 B1
(45) Date of Patent: *Jul. 29, 2003

(54) METHOD FOR FABRICATING HIGH-MELTING, WEAR-RESISTANT CERAMICS AND CERAMIC COMPOSITES AT LOW TEMPERATURES

(75) Inventors: Kenneth H. Sandhage, Upper Arlington, OH (US); Raymond Unocic, N. Las Vegas, NV (US); Matthew Dickerson, Westerville, OH (US); Kamila Guerra, Englewood, OH (US); Matthew Timberlake, Medina, OH (US)

(73) Assignee: The Ohio State University, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/843,528

(22) Filed: Apr. 25, 2001

Related U.S. Application Data

(60) Provisional application No. 60/200,645, filed on Apr. 28, 2000.

(51) Int. Cl.⁷ ................................................. B22D 19/14
(52) U.S. Cl. ........................................... 164/98; 164/97
(58) Field of Search ...................................... 164/98, 97

(56) References Cited

U.S. PATENT DOCUMENTS

| | | | | |
|---|---|---|---|---|
| 5,214,011 A | * | 5/1993 | Breslin ........................ | 501/127 |
| 5,238,883 A | * | 8/1993 | Newkirk et al. ............. | 148/405 |
| 5,403,790 A | * | 4/1995 | Claar et al. ................... | 419/12 |
| 5,728,638 A | * | 3/1998 | Strange et al. ................ | 419/19 |
| 6,407,022 B1 | * | 6/2002 | Sandhage et al. ............. | 501/80 |

* cited by examiner

Primary Examiner—Kuang Y. Lin
(74) Attorney, Agent, or Firm—Standley & Gilcrest LLP

(57) ABSTRACT

This invention relates to methods and apparatus useful in the ceramics industry. More specifically, this invention relates to the fabrication of high melting, wear-resistant ceramics and ceramic composites at low temperatures. The method involves reacting (1) a fluid formed from melting a metal alloy, comprising at least one reactive metal and at least one non-reactive metal, and having a melting temperature substantially below the product material melting point, typically below about 1500 C., with (2) a rigid, porous material. The reaction should occur for a sufficient time to allow the liquid to infiltrate the porous material and allow the active metal(s) to react with the porous material so as to form a ceramic or ceramic composite having a melting temperature substantially higher than 1500 C.

36 Claims, 4 Drawing Sheets

Microstructure of Fully-Reacted Carbide/Metal Composites

Secondary electron image, 1300 C / 8 hr.

52.8% ZrC, 19.0% WC, 22.3% W, 5.9% Cu

Crack deflection at ZrC/W interfaces

METHOD FOR FABRICATING HIGH-MELTING, WEAR-RESISTANT CERAMICS AND CERAMIC COMPOSITES AT LOW TEMPERATURES

This Application claims the benefit of U.S. Provisional Application No. 60/200,645, filed Apr. 28, 2000, which is hereby incorporated by reference in its entirety.

TECHNICAL FIELD OF THE INVENTION

The present invention is in the field of ceramics and ceramic composites.

BACKGROUND OF THE INVENTION

This invention relates to methods and apparatus useful in the ceramics industry. More specifically, this invention relates to the fabrication of high melting, wear-resistant ceramics and ceramic composites at low temperatures.

Ceramic-rich composites have many potential applications, such as in rocket nozzles, high-temperature valves, wear-resistant mining parts, and automotive brakes. These ceramic-rich composites provide the valuable properties of having a high melting temperature, necessary in these potentially heat-intensive applications, and being wear and creep resistant, as many of these applications involve grinding or repetitive wear conditions. The use of these materials has been hampered by the inability to produce low-cost composites that are capable of retaining both a high strength and a high toughness. One major obstacle to producing such low-cost ceramics and ceramic composites is the need to form the materials at a high temperature, which greatly increases the overall cost of the materials. It is desirable to obtain an economical method for producing such materials.

It is therefore an object of the present invention to develop a method for fabricating high melting, wear-resistant ceramics or ceramic composites at relatively low temperatures.

Although described with respect to the field of ceramics and ceramic composites, it will be appreciated that similar advantages may obtain in other applications of the present invention. Such advantages may become apparent to one of ordinary skill in the art in light of the present disclosure or through practice of the invention.

SUMMARY OF THE INVENTION

The present invention includes ceramics and ceramic composites. This invention also includes machines or electronic apparatus using these aspects of the invention. The present invention may also be used to upgrade, repair or retrofit existing machines or electronic devices or instruments of these types, using methods and components used in the art. The present invention also includes methods and processes for fabricating such materials.

The present invention includes a method for producing ceramics and ceramic composites. The method comprises reacting (1) a fluid formed from melting a metal alloy, comprising at least one reactive metal and at least one non-reactive metal, and having a melting temperature below about 1500 C., with (2) a rigid, porous material (typically a ceramic, ceramic composite, or material otherwise capable of forming a ceramic upon reaction with the reactive metal(s)). The reaction should occur for a sufficient time at a temperature below about 1500 C., such that the fluid infiltrates the porous material and the active metal(s) react(s) with the porous material so as to form a ceramic or ceramic composite having a melting temperature substantially higher than 1500 C.

The active metal(s) may be any metal(s) capable of forming a ceramic with the rigid, porous material, and is preferably selected from the group consisting of zirconium, titanium, hafnium and mixtures thereof. It is preferred that the non-reactive metal(s) does not participate in the formation of the ceramic phase of the product material, although some trace elements may remain in the material. It is also preferred that the non-reactive metal(s) be selected from the group consisting of copper, silver, iron, nickel, cobalt, zinc, cadmium, lead, bismuth, antimony, and mixtures thereof. It is preferred that the rigid, porous material comprise a material selected from the group consisting of borides, carbides, nitrides, carbon and boron. Carbon and boron are used in additive type reactions where the reactive metal(s) is/are added to form the ceramic. The rigid, porous material may also be preformed into a shape, the resultant ceramic or ceramic composite substantially maintaining that shape. As used herein, "maintaining" a shape means keeping the same basic geometric shape, although there may or may not be some fluctuation in dimensions attendant to the reaction process.

It is preferred that the metal alloy have a melting temperature substantially below that of the product material, typically below about 1500 C., preferably below about 1300 C. It is also preferred that the reaction be carried out at a temperature substantially below that of the product material, typically below about 1500 C., preferably below about 1300 C. The resulting ceramic or composite may have a melting temperature of at least 2000 C., 2500 C. or even as high as at least 3000 C. It is preferred that the product material have a density relative to theoretical density substantially in excess of about 80%, or in excess of 90%. The non-reactive metal is preferably removed during the reaction as a liquid or gas. The metal may be removed by any appropriate process, such as extrusion, de-wetting, or vaporization.

The present invention includes another method for producing a material selected from the group consisting of ceramics and ceramic composites. In this method, a fluid formed from melting a metal alloy is reacted with a rigid, porous material. The metal alloy comprises at least one reactive metal and at least one non-reactive metal, and has a melting temperature as described above. The rigid, porous material comprises a ceramic bearing an element capable of being at least partially displaced by the active metal(s). The reaction should occur for sufficient time at a reaction temperature as described above, such that the liquid infiltrates the porous material and the reactive metal reacts with the porous material so as to form a ceramic or ceramic composite having a melting temperature in the ranges given above. The active and non-reactive metals used in this method are preferably those mentioned above. The rigid, porous material is preferably selected from the group consisting of borides, carbides, and nitrides. The porous material may be preformed into a shape that is maintained throughout the reaction.

The metal alloy preferably has a melting temperature below about 1300 C., and the reaction is preferably also carried out at a temperature below about 1300 C. It is preferred that the resultant ceramics and ceramic composites have a melting temperature of at least 2000 C., at least 2500 C., or even as high as at least 3000 C. It is preferred that the product material have a density relative to theoretical density substantially in excess of about 80%, and may reach as high as in excess of 90%. The non-reactive metal(s) is/are preferably removed during the reaction as a liquid or gas, by any appropriate means such as extrusion, de-wetting, or vaporization. Some small amounts of the non-reactive metal(s) may remain in the product material, i.e., typically less than 10 atom percent.

The present invention also includes a method using a low temperature reaction and infiltration yielding a high temperature ceramic/composite using a zirconium, hafnium or titanium/copper alloy and tungsten carbide, nitride, and/or boride System. The method involves reacting (1) a fluid formed from melting a metal alloy of copper and at least one active metal selected from the group consisting of zirconium, hafnium and titanium (such as zirconium copper), the metal alloy having a melting temperature as described above with respect to the general method, preferably below about 1500 C., with (2) a rigid, porous material comprising a ceramic selected from the group consisting of borides and carbides of tungsten, and mixtures thereof (such as tungsten carbide). The reaction should occur for sufficient time at a reaction temperature in the range described above, preferably about 1500 C., such that the liquid infiltrates the porous material and the active metal reacts with the porous material so as to form a ceramic or ceramic composite having a melting temperature substantially higher than 1500 C., or as otherwise described above with respect to the general method.

The porous material may be preformed into a shape, which shape being substantially maintained during the reaction. The metal alloy preferably has a melting temperature below about 1300 C., and the reaction is also preferably carried out at a temperature below about 1300 C. The resultant ceramic or ceramic composite preferably has a melting temperature of at least 2000C., at least 2500 C., or at least 3000 C. The copper may be removed during the reaction as a liquid or gas, by any appropriate process such as extrusion, de-wetting, or vaporization.

Also included in the present invention is a ceramic or ceramic composite produced by each combination and permutation of the above methods. Product materials made in accordance with the present invention have been found to exhibit good wear and creep resistance, spalling resistance, and temperature resistance, making them suitable for applications where these are advantages.

DETAILED DESCRIPTION OF THE PREFERRED EMBODIMENT(S)

Figure 1:
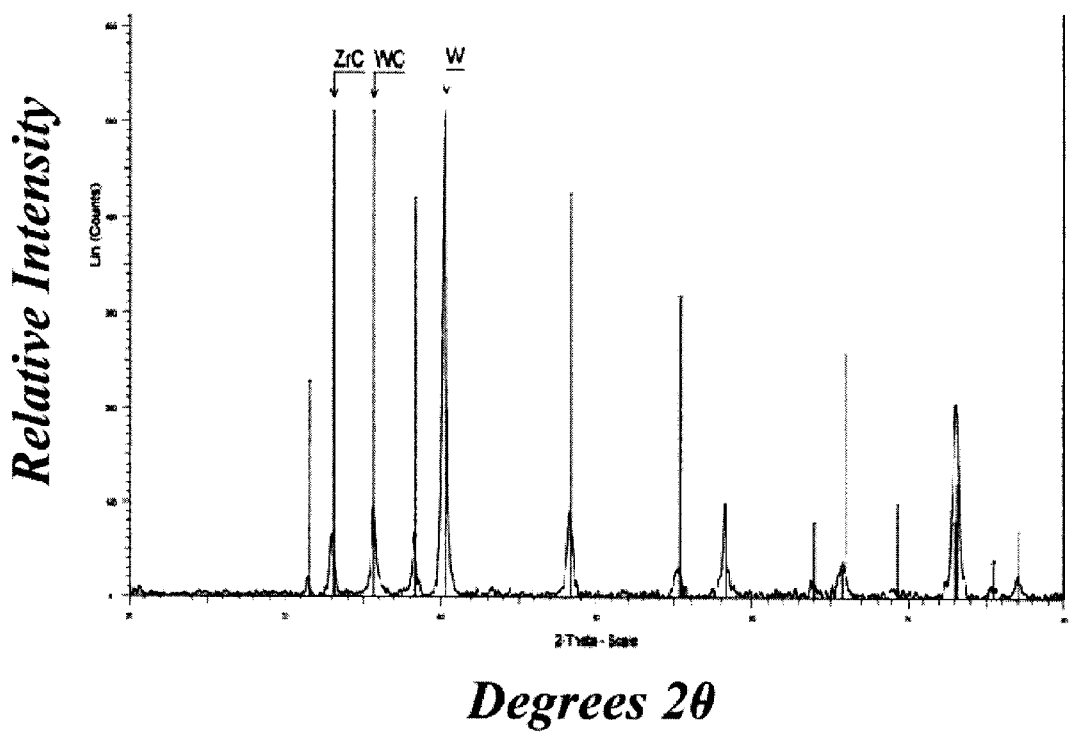
FIG. 1 is a graph of the phase content of a ceramic composite in accordance with the present invention.

In accordance with the foregoing summary, the following presents a detailed description of the preferred embodiment of the invention that is currently considered to include the best mode.

Zirconium-based composites have proven to be effective in the aforementioned applications. Zirconium composites may be formed by a liquid metal/solid carbide reaction of the following type:

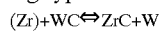

where (Zr) refers to Zirconium dissolved in a liquid metal solution. This reaction yields a larger volume of ceramic than is consumed, as ZrC possesses a larger molar volume than WC, so that the reaction is of the DCP type (Displacive Compensation of Porosity). The DCP reaction process for making ceramic-rich composites has been filed as a U.S. patent application by Pragati Kumar and Kenneth H. Sandhage entitled: "Method for Fabricating Shaped Monolithic Ceramics and Ceramic Composites through Displacive Compensation of Porosity, and Ceramics and Composites Made Thereby," filed on Apr. 28, 1998, Ser. No. 09/301,191 that is hereby incorporated herein. Because pure Zirconium melts at 1825° C., it would be more attractive to use a liquid solution of lower melting point in the above reaction than pure Zirconium.

The present invention relates to the use of metal alloys in fabricating these high-melting, wear-resistant ceramics and ceramic composites. The use of an alloy allows the combination of an active metal, which may have a melting temperature over 1500° C., with an inert, fugitive, non-reactive metal that melts at a relatively low temperature, less than 1500° C. The resultant alloy will then melt at a lower temperature than the active metal alone, preferably below 1300° C. The liquid may then infiltrate the pores of a porous ceramic precursor or preform allowing the active metal component to react with the precursor at a lower temperature than would be otherwise possible. The inert material selected should not form a stable carbide, boride, or nitride. Neither should the inert material wet the ceramic. As the inert metal will not react with the ceramic precursor, it may then exit the pores, such as through de-wetting, extraction, or vaporization. This process shall be referred to as the PRIMA process ("Pressureless Reversable Infiltration of Molten Alloys").

The ceramic precursor may also have an element that is displaced from the pores when the melted alloy infiltrates the precursor. Precursors comprised of carbides, borides, or nitrides will typically undergo such a displacement reaction, while precursors of carbon or boron will typically involve additive reactions. The precursor may be formed by any appropriate method, such as slip-casting, powderinjection molding, cold isostatic pressing, uniaxial pressing, tape casting, and tape calendaring. Residual non-reactive metal or other material may be left in the pores after reaction. Residual metal should not harm the strength or melting point of the ceramic, and may in fact increase the thermal conductivity of the ceramic.

The preferred embodiment of the present invention utilizes a Zr—Cu composition, preferably a $Zr_2Cu$ alloy. It is preferred that $Zr_2Cu$ be used because the composition exists as an intermediate compound with a modest melting point of around 1025° C., melting consistently at about 800° C. less than pure Zirconium but still containing a high Zirconium content.

The basic process is as follows: First, a porous preform of WC is prepared, preferably in the shape of a disk or bar. It is preferred that the preform be lightly sintered so as to be sufficiently rigid. Next, pieces of $Zr_2Cu$ are placed in contact with the porous WC preform. The preform is then preferably heated in a vacuum, inert atmosphere, or reducing atmosphere (such as an $H_2$—Ar atmosphere) to cause the $Zr_2Cu$ to melt, infiltrate the WC preform, and then react with the WC. The components may also be reacted in other conditions, such as in ambient air.

In order to form a Zr—Cu ingot, about 1 Kg of Zr and Cu in a MgO crucible and induction-melting the charge within the evacuated silica chamber. After solidification of the Zr—Cu ingot (nominal composition of $Zr_2Cu$) and cooling, pieces of the ingot were placed in contact with rigid, porous WC preforms. The preforms were prepared by uniaxial pressing of WC powder and polyvinyl alcohol (PVA) binder. The WC powder possessed an overall particle size of about 40 $\mu$m. The WC/PVA binder mixture was pressed into a bar shape at a stress of 7000 PSI. After drying for several days in a fume hood, the binder was removed by heating at 500° C. for 4 hours. The preforms were then partially sintered at 1750° C. for two hours to enhance ridgidity. The porosity of the partially-sintered WC preforms was about 50.4% (49.6% of the theoretical bulk density).

The infiltration experiments were conducted at 1050° C.–1200° C. in a flowing $H_2$/Ar atmosphere. After annealing for 1–2 hrs at 1050° C.–1200° C., the WC preforms had become infiltrated with the molten Zr—Cu. Electron microscopy revealed that the specimens annealed for one hour at 1050° C.–1200° C. had partially reacted to form some ZrC. However, X-ray diffraction analyses of powderized specimens revealed that the reaction was completed within two hours at 1200° C.

Figure 2:
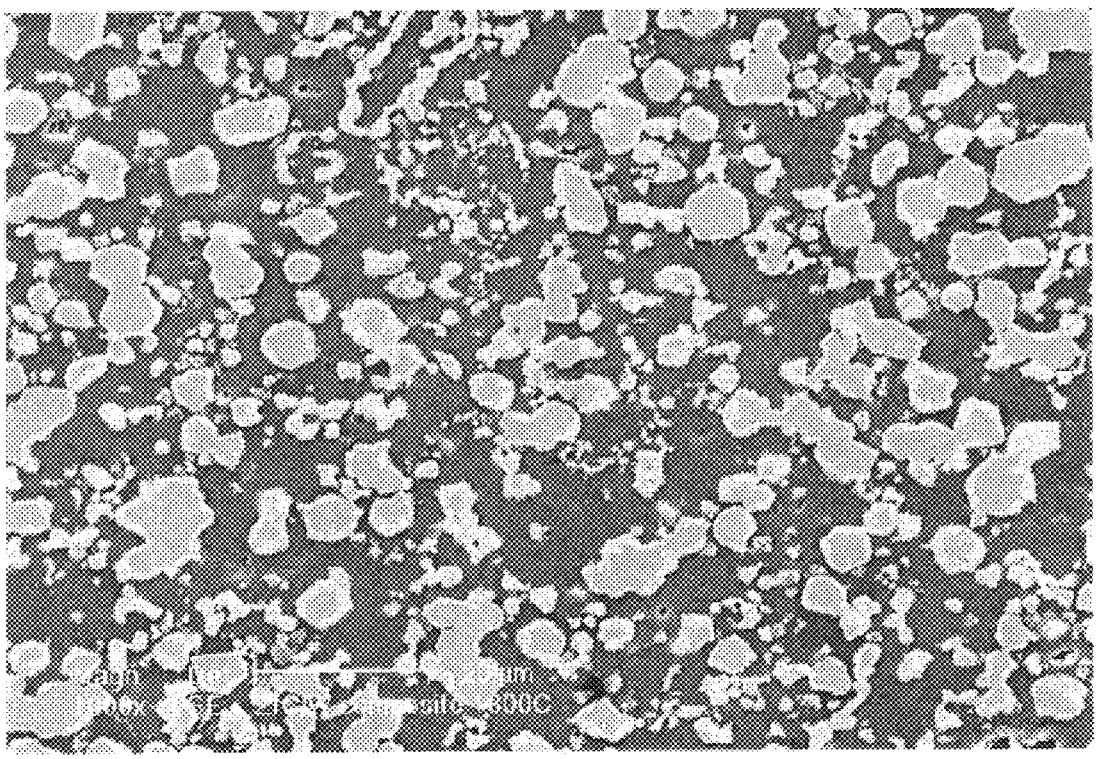
FIG. 2 is a pictorial view of the microstructure of a ceramic composite in accordance with the present invention.

In surprising results, the samples annealed at 1200° C. for two hours did not exhibit x-ray diffracted peaks for copper or a copper-zirconium bearing phase. The infiltrated and reacted samples also possessed an external copper-rich layer, which were tan-colored like copper. A graph of the phase content of fully-reacted carbide/metal composites after two hours at 1200° C. is shown in FIG. 1. A pictorial view of the resultant microstructure is shown in FIG. 2. The absence of Zr or Zr—Cu-bearing phases in the core of the preforms after the 1200° C. two hour anneal, along with the presence of an external copper-rich skin, indicated that the Zr—Cu liquid had infiltrated into the porous WC preform.

Figure 3:
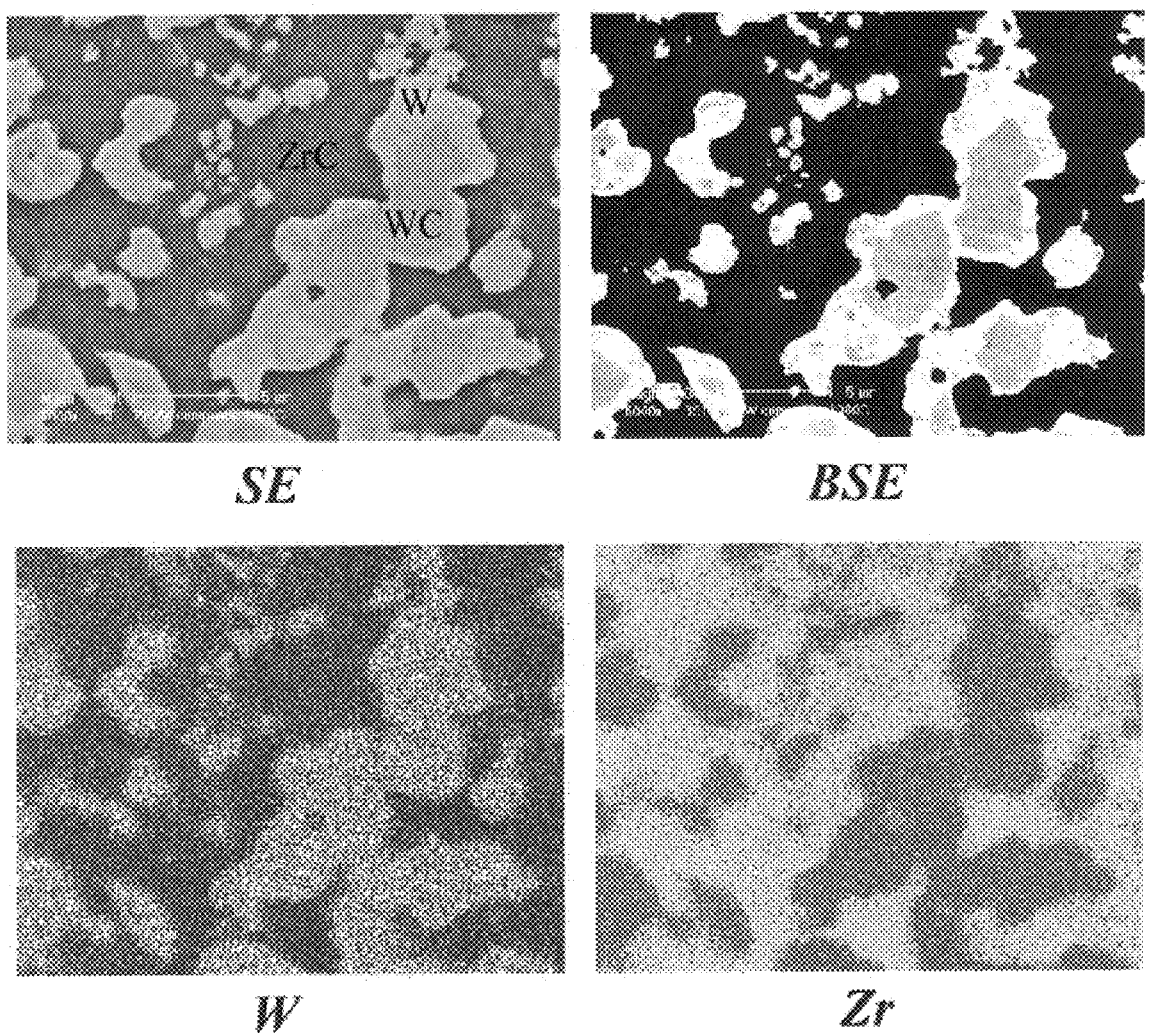
FIG. 3 shows multiple pictorial views of the microstructure of a ceramic composite in accordance with the present invention.
Figure 4:
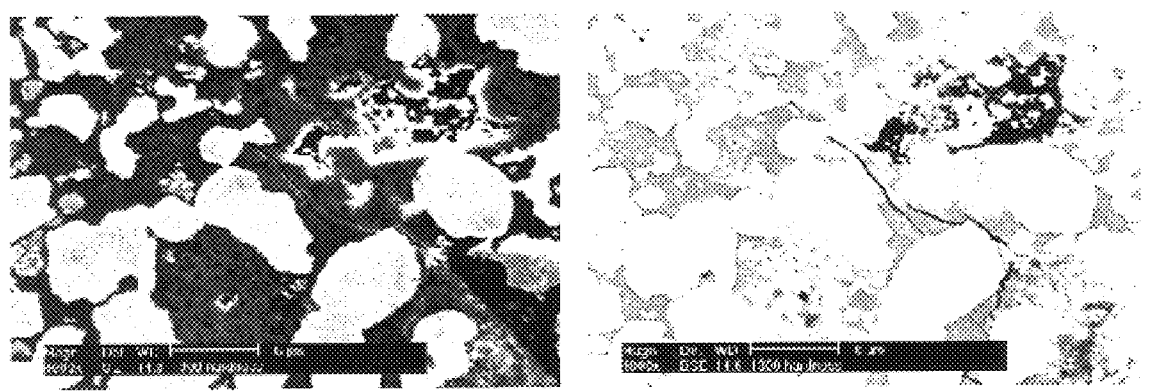
FIG. 4 shows pictorial views of the microstructure of a ceramic composite in accordance with the present invention.

FIG. 3 shows various views of the resultant microstructure. The upper lefthand image shows a scanning electron image, showing the amounts of ZrC (dark areas), W (light areas) and WC (medium areas). The upper right-hand image shows a back-scatter image of the same area. The lower left-hand image shows areas containing W highlighted in the light areas, while the lower right-hand image highlights areas of Zr.

Reaction of the Zr in the liquid with the WC caused the liquid to become depleted of Zr. Since this reaction is strongly favored from a thermodynamics perspective, the liquid can be quite zirconium depleted, or copper-rich. The resulting copper-rich liquid does not wet the ZrC or WC phases, or the liberated W, but forms an external layer around the preform. Upon cooling to room temperature, the copper-rich external layer solidifies into a copper-rich solid layer surrounding the reacted preform.

The general idea behind the method involves choosing a low-melting metal composition that contains a reactive element and one or more non-reactive element(s). The low-melting metal composition can then be infiltrated into a porous ceramic preform of desired shape. The reactive element (e.g., Zr) can then undergo a displacement reaction with a phase in the preform (e.g., WC). When the liquid becomes sufficiently depleted of the reactive element, the surface tension(s) associated with the liquid/solid interfaces in the preform will change, so as to cause the liquid to de-wet the solid phase(s) and migrate out of the pores of the preform. In this fashion, a low-melting liquid can be used to convert a porous ceramic-bearing preform into a dense, high-melting ceramic-rich composite that retains the same shape as the starting porous ceramic-bearing preform. This approach is very attractive from a commercial standpoint, in that it can lead to low-cost, near-net-shaped, refractory, hard ceramic metal composites. The low-cost advantage is a result of the low processing temperatures and the ability to form hard, dense, shaped components without the need to conduct extensive machining.

This same approach could be used to produce shaped ceramic-rich composites comprised of high melting and/or hard carbides, borides, nitrides, or combinations thereof. Such composites have a number of potential uses in mining, brakes, abrasives handling, grinding, and other applications requiring a hear wear resistance; rocket or aerospace components, such as rocket nozzles, requiring very high melting and highly-erosion-resistant components; and light-weight alternatives to relatively heavy monolithic refractory metals.

In the preferred embodiment discussed above, Zr—Cu-bearing liquid was used to convert a porous WC preform into a dense ZrC—WC—W-bearing composite containing very little Cu (or Cu-bearing phases). ZrC, WC, and W are chemically compatible phases that are each quite high melting. ZrC melts at about 3445° C., W melts at about 3422° C., and WC melts at about 2785° C. ZrC and WC are also hard carbides (much harder than W) of much lower density (density of ZrC is about 6.63 g/cm$^3$, density of WC is about 13.57 g/cm$^3$) than W (density of W is about 19.30 g/cm$^3$). The enhanced average hardness, enhanced erosion/abrasion resistance, and lighter weight of ZrC—WC—W composites relative to monolithic W, combined with the high melting nature and chemical compatibility of the composite phases make such composites attractive as replacements for W in applications such as rocket nozzle liners. The low processing temperatures associated with the present novel fugitive metal approach makes such composite processing very attractive.

Another example of a composite system that could be processed using this approach is the HfC/W system. Copper could again be used to suppress the processing temperature. For example, a Hf$_2$Cu ingot could be produced by induction melting at >1310° C., the melting point of Hf$_2$Cu. The Hf$_2$Cu could then be infiltrated into porous WC at >1310° C. and allowed to react with WC to produce HfC and W. It is expected that the hafnium-depleted, copper-rich liquid would again de-wet the solid HfC and W phases and migrate out of the preform. In this example, the resulting composite would consist of even higher melting solids than for Zr—WC—W composites, as HfC melts at about 3950° C.

It is anticipated that other fugitive, low-melting elements that could be used in place of copper as non-wetting inert liquids are: Ag, Ni, Co, Fe, and compounds or solid solutions between these compounds. That is, one or more of these elements could be present in a liquid with an active (reactive) element, such as Ti, Zr, Hf, V, Nb, or Ta, that can react with the ceramic in a preform, thereby depleting the liquid of the reacting element and changing the surface tensions of the liquid/solid interfaces so as to cause the liquid to de-wet the solids and migrate out of the preform. Examples of low-melting compositions that contain an active element and a possibly inert, non-wetting element include: Ti—Cu, Zr—Cu, Hf—Cu, Ti—Ni, Zr—Ni, Hf—Ni, Ta—Cu, and Ta—Ni. It should be noted that Cu, Ni, Fe, and Co do not form stable binary carbides at ambient pressure, 1 ATM, so that these elements will not react with carbon or carbides. Copper is also incapable of forming a stable boride binary compound at 1 ATM pressure, and so should not react with boron or borides. By "low melting" it is meant that these compositions melt at much lower temperatures than the solid products of the displacement reaction. In the examples discussed earlier, Zr$_2$Cu melted more than about 2500° C. below the peak melting temperature of ZrC$_{1-x}$ ($T_{melting}$ of ZrC$_{1-x}$≈6350° C.), and about 2400° C.

below the melting temperature of W ($T_{melting}$ W≈3422° C.). Examples of other possible displacement reactions between low-melting compositions (of an active element and an inert element) with ceramic solids to make very high melting ceramics include:

EXAMPLE 2

(Ti)+$WC_{1-x}$⇔$TiC_{1-x}$+W ($T_{melting}$ of $TiC_{1-x}$ is <=3077° C.)

In this case, the Ti-bearing liquid solution (Ti) could possess a composition of: TiCu, which melts at only ≈982° C.; $Ti_2Cu$, which completely melts at about 1084° C.; about 44 at% (atomic percent) Cu/56 at % Ti, which is a composition that melts at about 960° C.; $Ti_2Ni$, which melts completely at about 1084° C.; about 24 at % Ni/76 at % Ti, which is a composition that melts at 942° C.; $Ti_2Co$, which completely melts at about 1184° C.; about 23 at % Co/77 at % Ti, which is a composition that melts at about 1020° C.; TiFe, which melts at about 1317° C., about 30 at % Fe/70 at % Ti, which is a composition that melts at about 1085° C.

EXAMPLE 3

(Hf)+$WC_{1-x}$⇔$HfC_{1-x}$+W ($T_{melting}$ of $HfC_{1-x}$ is <=3950° C.)

In this case, the Hf-bearing liquid solution (Hf) could possess a composition of: $Hf_2Cu_{10}$, which melts at 1025° C.; $Hf_2Cu$, which completely melts at about 1310° C.; about 43.6 at % Hf/56.4 at % Cu, which is a composition that melts at about 980° C.; $Hf_2Ni$, which melts completely at about 1430° C.; about 84.25 at % Hf/15.75 at % Ni, which is a composition that melts at about 1150° C.; $Hf_2Co$, about 86 at % Hf/ 14 at % Co, which is a composition that melts at about 1278° C.; $Hf_2Fe$, which melts at about 1350° C., about 64 at % Hf/36 at % Fe, which is a composition that melts at about 1300° C.

EXAMPLE 4

(Nb)+$WC_{1-x}$⇔$NbC_{1-x}$+W ($T_{melting}$ of $NbC_{1-x}$ is <=3600° C.)

In this case, the Nb-bearing liquid solution (Nb) could possess a composition of: $Hf_2Cu_{10}$, which melts at ≈1025° C.; $NbNi_3$, which melts at about 1412° C.; about 16 at % Nb/84 at % Ni, which is a composition that melts at about 1282° C.; $Ni_6Nb_7$, which melts completely at about 1339° C.; about 40.5 at % Ni/59.5 at % Nb, which is a composition that melts at about 1175° C.; $Ni_6Co_7$, which melts at about 1402° C., about 39 at % Co/61 at % Nb, which is a composition that melts at about 1374° C.; $FeNb_{1-x}$, which melts at about 1687° C., about 63.75 at % Nb/36.25 at % Fe, which is a composition that melts at about 1400° C.

EXAMPLE 5

(Ta)+$WC_{1-x}$⇔$TaC_{1-x}$+W ($T_{melting}$ of $TaC_{1-x}$ is <=3985° C.)

In this case, the Ta-bearing liquid solution (Ta) could possess a composition of: TaNi, which melts at 1432° C., about 36 at % Ta/64 at % Ni, which is a composition that melts at about 1350° C.; about 13.5 at % Ta/86.5 at % Co, which is a composition that melts at about 1150° C.; about 42 at % Ta/58 at % Fe, which is a composition that melts at about 1570° C.

EXAMPLE 6

(U)+$WC_{1-x}$⇔$UC_{1-x}$+W ($T_{melting}$ of $UC_{1-x}$ is <=2800° C.)

In this case, the U-bearing liquid solution (U) could possess a composition of: about 51 at % U/49 at % Ni, which is a composition that melts at about 1202° C.; about 67 at % U/33 at % Ni, which is a composition that melts at about 1352° C.; about 41.5 at % U/58.5 at % Co, which is a composition that melts at about 1248° C.; about 67 at % U/33 at % Co, which is a composition that melts at about 1456° C.; about 31 at % U/69 at % Fe, which is a composition that melts at about 1468° C.

High melting composites containing refractory metals other than tungsten may also be fabricated in a similar manner, as in the following examples:

EXAMPLE 7

(Ti)+MoC⇔TiC+Mo ($T_{melting}$ of Mo is about 2623° C.)

In this case, the Ti-bearing liquid solution (Ti) could possess a composition similar to those discussed for the Ti-bearing solution of example 2.

EXAMPLE 8

(Zr)+MoC⇔ZrC+Mo

In this case, the Zr-bearing liquid solution (Zr) could possess a composition of: $Zr_2Cu$, which melts at about 1025° C., ZrCu which melts at about 935° C., about 72.4 at % Zr/27.6 at % Cu, which is a composition that melts at about 995° C.; $Cu_{10}Zr_7$ which metls at 985° C., $Zr_2Ni$, which melts at about 1120° C., about 76 at % Zr/24 at % Ni, which is a composition that melts at about 960° C.; about 64 at % Zr/36 at % Ni, which is a composition that melts at about 1010° C.; $Zr_2Co$, which melts at about 1100° C., about 78.5 at % Zr/21.5 at % Co, which is a composition that melts at about 981° C.; $Zr_3Fe$, which melts at about 960° C.; about 24.25 at % Fe/75.75 at % Zr, which is a composition that melts at about 928° C.; $Zr_2A_2$, which melts completely at about 1244° C.; $ZrA_2$, which melts completely at about 1148° C. These Zr-bearing liquids could also be used for the initial displacement reaction.

EXAMPLE 9

(Hf)+MoC⇔HfC+Mo

In this case, the Hf-bearing liquid solution (Hf) could possess a composition similar to those discussed for the Hf-bearing solution of example 3.

EXAMPLE 10

2(Ti)+$Cr_3C_2$⇔2TiC+3Cr ($T_{melting}$ of Cr is about 1863° C.)

In this case, the Ti-bearing liquid solution (Ti) could possess a composition similar to those discussed for the Ti-bearing solution of example 2.

EXAMPLE 11

2(Zr)+$Cr_3C_2$⇔2ZrC+3Cr

In this case, the Zr-bearing liquid solution (Zr) could possess a composition similar to those discussed for the Zr-bearing solution of example 8.

EXAMPLE 12

$$2(Hf)+Cr_3C_2 \Leftrightarrow 2Hf+3Cr$$

In this case, the Hf-bearing liquid solution (Hf) could possess a composition similar to those discussed for the Hf-bearing solution of example 3.

EXAMPLE 13

$$(Ti)+NbC_{1-x} \Leftrightarrow TiC_{1-x}+Nb \ (T_{melting} \text{ of Nb is about } 2477° \text{ C.})$$

In this case, the Ti-bearing liquid solution (Ti) could possess a composition similar to those discussed for the Ti-bearing solution of example 2.

EXAMPLE 14

$$(Zr)+NbC_{1-x} \Leftrightarrow ZrC_{1-x}+Nb$$

In this case, the Zr-bearing liquid solution (Zr) could possess a composition similar to those discussed for the Zr-bearing solution of example 8.

EXAMPLE 15

$$(Hf)+NbC_{1-x} \Leftrightarrow HfC_{1-x}+Nb$$

In this case, the Hf-bearing liquid solution (Hf) could possess a composition similar to those discussed for the Hf-bearing solution of example 3.

EXAMPLE 16

$$(Ti)+TaC_{1-x} \Leftrightarrow TiC_{1-x}+Ta \ (T_{melting} \text{ of Ta is about } 3017° \text{ C.})$$

In this case, the Ti-bearing liquid solution (Ti) could possess a composition similar to those discussed for the Ti-bearing solution of example 2.

EXAMPLE 17

$$(Zr)+TaC_{1-x} \Leftrightarrow ZrC_{1-x}+Ta$$

In this case, the Zr-bearing liquid solution (Zr) could possess a composition similar to those discussed for the Zr-bearing solution of example 8.

EXAMPLE 18

$$(Hf)+TaC_{1-x} \Leftrightarrow HfC_{1-x}+Ta$$

In this case, the Hf-bearing liquid solution (Hf) could possess a composition similar to those discussed for the Hf-bearing solution of example 3.

It should be noted that, because Cu does not form stable intermetallic compounds with W, Mo, Cr, Ta, Nb, and U and because there is very little solid or liquid solubility of Cu in these other elements (particularly in Ta, W, Mo, and Cr), copper may be a preformed inert fugitive element for this new process (i.e., reactions likely to enhance wetting with W, Mo, Cr, Ta, Nb, and U will not occur with Cu.

High melting ceramic compounds other than carbides (e.g., borides and nitrides) may also be fabricated by this fugitive metal approach. Possible other reactions include:

EXAMPLE 19

$$(Zr)+TaB_2 \Leftrightarrow ZrB_2+Ta \ (T_{melting} \text{ of } ZrB_2 \text{ is about } 3210° \text{ C.})$$

In this case, the Zr-bearing liquid solution (Zr) could possess a composition similar to those discussed for the Zr-bearing solution of example 8.

EXAMPLE 20

$$(Ti)+TaB_2 \Leftrightarrow TiB_2+Ta \ (T_{melting} \text{ of } TiB_2 \text{ is about } 3225° \text{ C.})$$

In this case, the Ti-bearing liquid solution (Ti) could possess a composition similar to those discussed for the Ti-bearing solution of example 2.

EXAMPLE 21

$$(Hf)+TaB_2 \Leftrightarrow HfB_2+Ta \ (T_{melting} \text{ of } HfB_2 \text{ is about } 3380° \text{ C.})$$

In this case, the Hf-bearing liquid solution (Hf) could possess a composition similar to those discussed for the Hf-bearing solution of example 3.

EXAMPLE 22

$$(Zr)+CrB_2 \Leftrightarrow ZrB_2+Cr$$

In this case, the Zr-bearing liquid solution (Zr) could possess a composition similar to those discussed for the Zr-bearing solution of example 8.

EXAMPLE 23

$$(Ti)+CrB_2 \Leftrightarrow TiB_2+Cr$$

In this case, the Ti-bearing liquid solution (Ti) could possess a composition similar to those discussed for the Ti-bearing solution of example 2.

EXAMPLE 24

$$(Hf)+CrB_2 \Leftrightarrow HfB_2+Cr$$

In this case, the Hf-bearing liquid solution (Hf) could possess a composition similar to those discussed for the Hf-bearing solution of example 3.

EXAMPLE 25

$$(Zr)+TaN \Leftrightarrow ZrN+Ta \ (T_{melting} \text{ of ZrN is about } 2960° \text{ C.})$$

In this case, the Zr-bearing liquid solution (Zr) could possess a composition similar to those discussed for the Zr-bearing solution of example 8.

EXAMPLE 26

$$(Zr)+CrN \Leftrightarrow ZrN+Cr$$

In this case, the Zr-bearing liquid solution (Zr) could possess a composition similar to those discussed for the Zr-bearing solution of example 8.

EXAMPLE 27

$$(Zr)+NbN \Leftrightarrow ZrN+Nb$$

In this case, the Zr-bearing liquid solution (Zr) could possess a composition similar to those discussed for the Zr-bearing solution of example 8.

EXAMPLE 28

(Hf)+TaN⇔HfN+Ta (T$_{melting}$ of HfN is about 3387° C.)

In this case, the Hf-bearing liquid solution (Hf) could possess a composition similar to those discussed for the Hf-bearing solution of example 3.

EXAMPLE 29

(Hf)+CrN⇔HfN+Cr

In this case, the Hf-bearing liquid solution (Hf) could possess a composition similar to those discussed for the Hf-bearing solution of example 3.

EXAMPLE 30

(Hf)+NbN⇔HfN+Nb

In this case, the Hf-bearing liquid solution (Hf) could possess a composition similar to those discussed for the Hf-bearing solution of example 3.

EXAMPLE 31

(Ti)+TaN⇔TiN+Ta (T$_{melting}$ of TiN is about 3290° C.)

In this case, the Ti-bearing liquid solution (Ti) could possess a composition similar to those discussed for the Ti-bearing solution of example 2.

EXAMPLE 32

(Ti)+CrN⇔TiN+Cr

In this case, the Ti-bearing liquid solution (Ti) could possess a composition similar to those discussed for the Ti-bearing solution of example 2.

EXAMPLE 33

(Ti)+NbN⇔TiN+Nb

In this case, the Ti-bearing liquid solution (Ti) could possess a composition similar to those discussed for the Ti-bearing solution of example 2.

It should be noted that these examples are thermodynamically favored reactions at 1ATM pressure at temperatures above the melting points of the reacting liquids, provided that the activity of the reactive element in the liquid solution is sufficiently high. These reactions are also presented as possible examples, and are not presented with the intent of limiting other possible reactions of this type from being considered.

COMPARATIVE EXPERIMENT

A Zr—W melt composition was prepared by mixing Zr and W powder (91 at % Zr, 9 at % W) in a mortar and pestle for 15 minutes. This composition was pressed into disks (12 mm diameter, 3 mm thick). A 55% dense (45% porous), disk-shaped WC preform was prepared by slip casting and subsequent sintering at 1550 C. for an hour. This porous WC preform was placed beween two Zr—W disks in a graphite furnace. This assembly was heated to 1770 C. at a rate of 10C/min under flowing Argon. The samples were held at the peak temperature of 1770 C. for 1–2 hr. Then furnace was then shut down and cooled to room temperature.

Investigation of the assembly showed that Zr—W disks had melted as expected due to a eutectic reaction in the Zr—W system at 1735 C. This eutectic melt however, did not infiltrate more than a few microns into the WC preform. SEM investigation of polished cross-sections of the WC specimen revealed that a reaction between the Zr—W melt and WC preform resulted in the formation of a continuous, solid W layer at the infiltration front. The formation of this continuous solid W layer blocked further infiltration of the Zr—W liquid into the WC preform. This result indicated that the loss of Zr from the liquid (due to the formation of ZrC by reaction of the melt with WC) caused W to precipitate from the liquid as a continuous layer at the infiltration front. In order to avoid such continuous W formation and blockage at the infiltration front, much lower melting liquids (i.e., liquids free of tungsten) needed to be infiltrated into the WC preform. Such low-melting liquids would allow for infiltration at much lower temperatures than 1735° C. and, hence, slower reactions at the infiltration front (i.e., greatly reduced formation of pore-blocking solids) that, in turn, should allow for much greater infiltration prior to extensive reaction.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, or through the use of equivalent process steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

What is claimed is:

1. A method for producing a ceramic/metal composite, said method comprises reacting:
   (a) a fluid formed from melting a metal alloy comprising at least one reactive metal and at least one non-reactive metal, said metal alloy having a melting temperature below about 1500° C.; and
   (b) a rigid, porous material comprising an initial ceramic phase having a volume, said initial ceramic phase comprising a displaceable metal adapted to be at least partially displaced by said at least one reactive metal, for a sufficient time at a temperature below about 1500° C. such that said fluid infiltrates said rigid, porous material and said at least one reactive metal reacts with said rigid, porous material so as to displace said displaceable metal, thereby forming said ceramic/metal composite, said ceramic/metal composite comprising a final ceramic phase having a volume and a metal phase comprising said displaceable metal, wherein said volume of said final ceramic phase is grater than or equal to said volume of said initial ceramic phase, and wherein said ceramic/metal composite has a melting temperature substantially higher than 1500° C.

2. A method according to claim 1 wherein said at least one reactive metal is selected from the group consisting of zirconium, titanium, hafnium and mixtures thereof.

3. A method according to claim 1 wherein said at least one non-reactive metal is selected from the group consisting of copper, silver, iron, nickel, cobalt, zinc, cadmium, lead, bismuth, antimony, and mixtures thereof.

4. A method according to claim 1 wherein said ceramic/metal composites has a metal phase consisting essentially of said displaceable metal.

5. A method according to claim 1 wherein said at least one displaceable metal is selected from the group consisting of refractory metals.

6. A method according to claim 1 wherein said at least one displaceable metal is selected from the group consisting of tungsten, molybdenum, tantalum and niobium.

7. A method according to claim 1 wherein said rigid, porous material comprises a material selected from the group consisting of borides, carbides, nitrides, carbon and boron.

8. A method according to claim 1 wherein said rigid, porous material is preformed into a shape, and wherein said material selected from the group consisting of ceramic/metal composites maintains said shape.

9. A method according to claim 1 wherein said metal alloy has a melting temperature below about 1300 C., and wherein said reaction is carried out at a temperature below about 1300 C.

10. A method according to claim 1 wherein said material selected from the group consisting of ceramic/metal composites has a melting temperature of at least 2000 C.

11. A method according to claim 1 wherein said material selected from the group consisting of ceramic/metal composites has a melting temperature of at least 2500 C.

12. A method according to claim 1 wherein said material selected from the group consisting of ceramic/metal composites has a melting temperature of at least 3000 C.

13. A method according to claim 1 wherein said product material has a density relative to theoretical density substantially in excess of about 80%.

14. A method according to claim 1 wherein said non-reactive metal is removed during said reaction as a liquid or gas.

15. A method according to claim 14 wherein said non-reactive metal is removed during said reaction by a process selected from the group consisting of extrusion, de-wetting, and vaporization.

16. A method for producing a ceramic/metal composite, said method comprising reacting:
(a) a fluid formed from melting a metal alloy comprising at least one reactive metal selected from the group consisting of zirconium, titanium, hafnium and mixtures thereof, and at least one non-reactive metal selected from the group consisting of copper, silver, iron, nickel, cobalt, zinc, cadmium, lead, bismuth, antimony and mixtures thereof, said metal alloy having a melting temperature below about 1500° C.; and
(b) a rigid, porous material comprising an initial ceramic phase having a volume, said initial ceramic phase comprising a displaceable metal comprising a refractory metal selected from the group consisting of tungsten, molybdenum, tantalum and niobium, and adapted to be at least partially displaced by said at least one reactive metal, for a sufficient time at a temperature below about 1500° C. such that said fluid infiltrates said rigid, porous material and said at least one reactive metal reacts with said rigid, porous material so as to displace said displaceable metal, thereby forming said ceramic/metal composite, said ceramic/metal composite comprising a final ceramic phase having a volume and a metal phase comprising said displaceable metal, wherein said volume of said final ceramic phase is greater than or equal to said volume of said initial ceramic phase, and wherein said ceramic/metal composite has a melting temperature substantially higher than 1500° C.

17. A method according to claim 16 wherein said rigid, porous material comprises a material selected from the group consisting of borides, carbides, and nitrides.

18. A method according to claim 16 wherein said rigid, porous material is preformed into a shape, and wherein said material selected from the group consisting of ceramic/metal composites maintains said shape.

19. A method according to claim 16 wherein said metal alloy has a melting temperature below about 1300 C., and wherein said reaction is carried out at a temperature below about 1300 C.

20. A method according to claim 16 wherein said material selected from the group consisting of ceramic/metal composites has a melting temperature of at least 2000 C.

21. A method according to claim 16 wherein said material selected from the group consisting of ceramic/metal composites has a melting temperature of at least 2500 C.

22. A method according to claim 16 wherein said material selected from the group consisting of ceramic/metal composites has a melting temperature of at least 3000 C.

23. A method according to claim 16 wherein said product material has a density relative to theoretical density substantially in excess of about 80%.

24. A method according to claim 16 wherein said non-reactive metal is removed during said reaction as a liquid or gas.

25. A method according to claim 24 wherein said non-reactive metal is removed during said reaction by a process selected from the group consisting of extrusion, de-wetting, and vaporization.

26. A method for producing a ceramic/metal composite, said method comprising reacting:
(a) a fluid formed from melting a metal alloy of copper and at least one active metal selected from the group consisting of zirconium, hafnium and titanium, said metal alloy having a melting temperature below about 1500° C.; and
(b) a rigid, porous material, said rigid, porous material comprising an initial ceramic having a volume, said initial ceramic selected from the group consisting of borides and carbides of tungsten, and mixtures thereof, for a sufficient time at a temperature below about 1500° C. such that said fluid infiltrates said rigid, porous material and said at least one reactive metal reacts with said rigid, porous material so as to form a ceramic/metal composite comprising a final ceramic whose volume is greater than said volume of said initial ceramic, wherein said ceramic/metal composite has a melting temperature substantially higher than 1500° C.

27. A method according to claim 26 wherein said rigid, porous material is preformed into a shape, and wherein said material selected from the group consisting of ceramic/metal composites maintains said shape.

28. A method according to claim 26 wherein said metal alloy has a melting temperature below about 1300 C., and wherein said reaction is carried out at a temperature below about 1300 C.

29. A method according to claim 26 wherein said material selected from the group consisting of ceramic/metal composites has a melting temperature of at least 2000 C.

30. A method according to claim 26 wherein said material selected from the group consisting of ceramic/metal composites has a melting temperature of at least 2500 C.

31. A method according to claim 26 wherein said material selected from the group consisting of ceramic/metal composites has a melting temperature of at least 3000 C.

32. A method according to claim 26 wherein said product material has a density relative to theoretical density substantially in excess of about 80%.

33. A method according to claim 26 wherein said copper is removed during said reaction as a liquid or gas.

34. A method according to claim 33 wherein said copper is removed during said reaction by a process selected from the group consisting of extrusion, de-wetting, and vaporization.

35. A method according to claim 26 wherein said metal alloy is zirconium-copper.

36. A method according to claim 26 wherein said rigid, porous material is tungsten carbide.

* * * * *

UNITED STATES PATENT AND TRADEMARK OFFICE
CERTIFICATE OF CORRECTION

PATENT NO. : 6,598,656 B1
DATED : July 29, 2003
INVENTOR(S) : Sandhage et al.

It is certified that error appears in the above-identified patent and that said Letters Patent is hereby corrected as shown below:

<u>Column 12,</u>
Line 57, please delete the word "grater" and replace it with the word -- greater --.

Signed and Sealed this

Thirtieth Day of December, 2003

JAMES E. ROGAN
*Director of the United States Patent and Trademark Office*